Feb. 22, 1966 T. M. HERTZ 3,236,999

COMPUTER HAVING FLOATING POINT DIVISION

Filed Oct. 1, 1962 14 Sheets-Sheet 1

INVENTOR.
THEODORE M. HERTZ

BY L. Lee Humphries

ATTORNEY

Feb. 22, 1966 T. M. HERTZ 3,236,999

COMPUTER HAVING FLOATING POINT DIVISION

Filed Oct. 1, 1962 14 Sheets-Sheet 2

INVENTOR.
THEODORE M. HERTZ

BY L. Lee Humphries

ATTORNEY

COMPUTER HAVING FLOATING POINT DIVISION

Filed Oct. 1, 1962 14 Sheets-Sheet 3

INVENTOR.
THEODORE M. HERTZ
BY *L. Lee Humphries*
ATTORNEY

Feb. 22, 1966 T. M. HERTZ 3,236,999

COMPUTER HAVING FLOATING POINT DIVISION

Filed Oct. 1, 1962 14 Sheets-Sheet 4

INVENTOR.
THEODORE M. HERTZ

BY L. Lee Humphries

ATTORNEY

| | | |
|---|---|---|
| 00 | ICH | Input number of characters from device specified |
| 01 | OCH | Output number of characters from device specified |
| 02 | ALS | Shift number in A register left by amount specified |
| 02.2 | ASV | Same as 02 with overflow indication of 1 lost |
| 02.4 | ASC | Same as 02 with normalizing - optional termination |
| 03 | ARS | Shift A register right by amount specified |
| 05 | STR | Store number in R register in address specified |
| 10 | TIX | Transfer to new location count if index ≠ 0, decrement |
| 11 | TNZ | Transfer if number in A register is not equal to zero |
| 12 | SAP | Set sign of A register positive |
| 12.4 | SAN | Set sign of A register negative |
| 13 | CSA | Change sign of the A register |
| 15 | TLB | Transfer if the least significant bit of A is a one |
| 16 | CAZ | Clear A register to plus zero |
| 16.4 | CMZ | Clear A register to minus zero |
| 17 | CMP | One's complement A register bits, including sign |
| 17.4 | RND | Round A register number if most significant R bit is 1 |
| 25.1 | STI | Store index in right hand address portion specified |
| 31.1 | LDI | Read index from right hand portion of address to G41 |
| 35 | CMG | Compare, set Jo true for B A, false for B = A * |
| 35.4 | CME | Compare, set Jo true for B A or B A, false for B = A |
| 36 | CLS | Clear A register and subtract addressed operand |
| 37 | CLA | Clear A register and add addressed operand thereto |
| 40 | CTL | Copy from address specified to L loop to end of loop |
| 41 | CTV | Copy from address specified to V loop to end of loop |
| 42 | LLS | Long left shift A and R registers by amount specified |
| 42.2 | LSV | Same as 42 with overflow for loss of a 1 by shift |
| 42.4 | LSC | Same as 42 with normalizing - optional termination |
| 43 | LRS | Long right shift of A and R registers |
| 44 | CFL | Copy from L loop to Main memory starting at address |
| 45 | STO | Store number in A register in address specified |
| 50 | TZE | Transfer if number in A register is zero |
| 51 | TRA | Transfer unconditionally |
| 52 | TOV | Transfer on overflow (no halt if overflow) |
| 53 | TMI | Transfer if A register sign is negative |
| 54 | NOP | No operation |
| 55 | TPL | Transfer if A register sign is positive |
| 56 | XAR | Interchange A and R registers |
| 57 | CAR | Copy A register into the R register, clear A |
| 63 | MPY | Multiply A number by operand in address specified |
| 65 | STA | Store address in A register in address specified |
| 66 | DIV | Divide A number by operand in address specified |
| 70 | EXT | Logical multiplication of A number by operand specified |
| 71 | HTR | Halt and transfer unconditionally |
| 72 | SUB | Subtract operand specified from A register number |
| 73 | ADD | Add operand specified to A register number |
| 76 | RCS | Clear and subtract (Copy A to R) |
| 77 | RCA | Clear and Add (Copy A to R) |
| 23 | FMP | Floating Multiply |
| 26 | FDV | Floating Divide |
| 74 | FSB | Floating Subtract |
| 75 | FAD | Floating Add |

* Assume overflow was off; if overflow was on initially then if B = A 0, do nothing; if B = A 0, reverse Jo

FIG. 5

INVENTOR.
THEODORE M. HERTZ
BY L. Lee Humphries
ATTORNEY

InDo Phase (1WT)

FLOATING DIVIDE MODE

1. Computer is set for floating divide (code 26)

2. Divisor is copied into B register (Dividend is assumed to be in A register originally)

3. 32 count set up in G register $\text{1g41 = Do Kg D6' }\underline{\text{T20}}$
   $\text{Og41 = Do Kg P5P4}\overline{\text{P3P2}}$ 4. Test to see if B > A, if so:

$\text{1ec = A41'B41I1R42'}$
   $\text{Oec = T2 Fm' (Reset initially)}$
   if B < A
   $\text{Oec = A41 B41' I1 R42'}$ 5. Exponent is excluded from number comparison $\text{1r42 = }\underline{\text{In}}\text{ Do D6' }\underline{\text{T33}}$
   $\text{1Fm = }\overline{\underline{\text{N11}}}\text{ D6'D4'}\overline{\text{D2}}$ 6. Prepare for divide operation in U1 phase $\text{Or42 = }\underline{\text{N11}}\text{ D2}$
   $\text{Or43 = }\overline{\text{Z1'}}\text{Go'}\underline{\text{T22}}\text{ }\underline{\text{In}}\text{ Do}$
   $\text{+Z1'Go }\overline{\underline{\text{T2}}}\text{ }\overline{\underline{\text{In}}}\text{ Do}$ 7. If B > A (normal divide case) force operation code 66 for fixed point divide $\text{1d6 = }\underline{\text{N11}}\text{ D4' D2 Ec}$
   $\underline{\text{MsL}}\text{ = }\overline{\text{D4'}}\text{ D3 I3a C4'}$
   $\overline{\text{1I3a}}\text{ = }\underline{\text{N11}}\text{ D2}$

FIG. 6

INVENTOR.
THEODORE M. HERTZ
BY L. Lee Humphries
ATTORNEY

U1 Phase (1WT)

FLOATING DIVIDE MODE

1. Exponent bias inverted

2. Contents of B register subtracted (fixed point subtraction logic) from contents of A register since D1' indicates subtraction is to be carried out. Difference is written back into A register and precessed left one bit.

```
1a41 = S MsL Do' T1'
0a41 = S' MsL Do'
1a40 = A41 I2
0a40 = A41' I2
1a39 = A40 I2 T1'
0a39 = A40' I2 T1'
1a2  = A3
0a2  = A3'
1a1  = A2 D6 I2 + A2'Fm D6'Ec + A3FmD6'Ec
0a1  = A2'D6 I2 + A2 Fm D6'Ec + A3'FmD6'Ec
M2   = I3a D5 D4' D3
Ir1  = M2 Do' T1 (set for gating into subtracter)
Or1  = I3a T40 D6 D5
```

3. B register is recirculated

```
1b41 = B1 I3a D2
0b41 = B1' I3a D2
1b40 = B41 D5 D4'
0b40 = B41' D4'
```

4. Obtain sign of quotient

```
1c2 = U1 D2 T1
0c2 = U1 T41 A1' B1 D5 D4' D2 + U1 T2 A40 B40' D5 D4'D2
```

5. When overborrow (B> A) occurs:

```
0d6 = T31 D6 (D6' serves as carry flip flop)
```

Correct for overborrow:

```
1a1 = A2' Fm D6' Ec'
0a1 = A2 Fm D6' Ec
```

Afterwards:

```
1d6 = Fm C6 A2' T1
1c6 = T31 D6
0c6 = I3a D5 P4' P2' (T1)
```

6. Special case if B < A - correct to prevent overflow

```
1a1 = A3 Fm D6' Ec'
(Shift right one bit so that B> A)
1d6 = T31 D6' (Allows the copying of LSB into A1)
0d6 = Fm I2 D1' T32 C6' (Addition of two to correct
                          for overborrow condition)
1c6 = I3a D5 T32
1a1 = A3 Fm D6' Ec' + A2' Fm D6' Ec + A2 I2 D6
```

7. Check for exponent overflow or underflow

```
1jo = Kc' Fm I2 D1' T40 A1'B1'Ka' (Overborrow)
    + Kc' Fm I2 D1' T40 A1 B1 Ka  (Underflow)
```

8. If zero divisor (causes overflow)

```
1jo = Fm I2 D1' T32 B1' (Overflow)
1kc = Fm I2 T32 B1'
```

FIG. 7

INVENTOR.
THEODORE M. HERTZ
BY L. Lee Humphries
ATTORNEY

U1 Phase (1WT) (Continued)

FLOATING DIVIDE MODE

9. Zero dividend

0d3 = $\underline{In}$ Do D6' D4' A1' $\underline{T32}$
1d6 = $\overline{\underline{N11}}$ D3'
1kc = $\overline{Fm}$ $\underline{T32}$ I2 D3' A1'

10. Copy difference between exponents into B register (change operation code from 66 to 72)

1d4 = $\underline{Fm}$ $\underline{T33}$ I2
0d3 = $\overline{Fm}$ $\overline{T33}$ I2
1b40 = $\overline{S}$ $\overline{Mo}$ I2
$\underline{Mo}$ = I3a D5 D4 D3'

11. (Convert back to 66 at end of D1)

0d4 = Fm T41
1d3 = Fm T41 I2

12. Convert 66 to 67 (force addition during second word time because of overborrow during first word of division)

1d1 = Fm I2 T41

FIG. 7a

INVENTOR.
THEODORE M. HERTZ
BY L. Lee Humphries
ATTORNEY

Ui Phase (31 WT)

FLOATING DIVIDE MODE

1. Fixed point division logic used for each word
2. Gate into subtractor (from T1-T32)

0r1 = Fm I2' T32
   1r1 = M2 Do' T1

3. Copy quotient bits into R42 according to state of D1

1r42 = M2 D6 D1' I2' T1 (Quotient bit one)
   0r42 = M2 D1 I2' T1 (Quotient bit zero)
   1d1 = A1 Ka' T33 Fm I2' Nz'
   0d1 = A1 Ka T33 Fm D3 Do'

4. After 32 word times set Do for entering Ui Do phase (last word time of divide)

1c1 = M2 I2
   0c1 = G1 Kg I3a T20
   1do = M2 C1' Ko

FIG. 8

Ui Do Phase (1WT)

FLOATING DIVIDE MODE

1. Copy quotient bits into A register

1a41 = R42 Mo Do T41'
   0a41 = R42' Mo Do T41'

2. Convert to clear and add at T32 time

1d4 = Fm Do T32
   Moo = I3a D5 D4 D3 T41'

3. Copy exponent from B register to A register

1a41 = B1 Moo D2
   0a41 = B1' Moo D2

4. Copy stored sign of quotient into A register

1a41 = C2 I3a K41
   0a41 = C2' I3a K41

5. Terminate operation

1kc = Ui D3 D1 T40
   1d1 = M2 Do

FIG. 9

INVENTOR.
THEODORE M. HERTZ
BY L. Lee Humphries
ATTORNEY

INVENTOR.
THEODORE M. HERTZ
BY L. Lee Humphries
ATTORNEY

INVENTOR.
THEODORE M. HERTZ
BY L. Lee Humphries
ATTORNEY

COMPUTER HAVING FLOATING POINT DIVISION

Filed Oct. 1, 1962 14 Sheets-Sheet 12

INVENTOR.
THEODORE M. HERTZ

BY L. Lee Humphries

ATTORNEY

INVENTOR.
THEODORE M. HERTZ
BY L. Lee Humphries
ATTORNEY

COMPUTER HAVING FLOATING POINT DIVISION

Filed Oct. 1, 1962

INVENTOR.
THEODORE M. HERTZ

BY L Lee Humphries

ATTORNEY 3,236,999

COMPUTER HAVING FLOATING POINT DIVISION

Theodore M. Hertz, Whittier, Calif., assignor to North American Aviation, Inc.

Filed Oct. 1, 1962, Ser. No. 227,366
16 Claims. (Cl. 235—164)

This invention relates to electronic digital computers and more particularly to a computer having floating point division capabilities.

Prior art digital computers utilized fixed point arithmetic processes in executing computer operations. In performing fixed point arithmetic processes a computer assumes the binary point (analogous to a decimal point) to be between the sign of a number and the most significant digit of the number. Thus the number is considered to have an absolute value of less than one. As explained in patent application filed approximately September 24, 1962 for "Computer Having Floating Point Addition and Floating Point Subtraction" invented by me, in order to execute fixed point addition and subtraction operations, numbers to be operated upon by a computer must first be appropriately scaled prior to computation in order to obtain meaningful results. The scaling of the numbers is accomplished prior to entering them into the computer or by shifting them through programming afterwards. Fixed point division numbers need to be scaled prior to performing computation with them. In division hand scaling or shifting of the numbers through programming to a lesser magnitude may be necessary to insure against obtaining a quotient equal to or greater than one which causes or would cause overflow. In division shifting of the result through use of a program is desirable in order to prevent loss of significant portions which should be retained for use in later computations. This is particularly true where after a division operation has been performed, the product or quotient must be added or subtracted from or with other numbers, in which case scaling would first have to be done before the additional computation could be made.

In order to overcome the limitations above, a system has been devised whereby numbers are automatically scaled inside the computer. This system is called herein a floating point arithmetic process. In the floating point format, a word is divided into a sign bit, a characteristic, and a mantissa. The characteristic is the exponent to which the base number 2 is raised. The mantissa is expressed as a binary fraction, as a number less than one. In order to determine the numerical value indicated by the characteristic and mantissa, the base number 2 must first be raised to the value of the characteristic, the results of that operation then multiplied by the fraction represented by the mantissa.

In floating point division, the dividend is initially transferred to a first register and the divisor is transferred to a second register. A counter or third register is set up to terminate the division operation after it has been completed.

As may be deduced from analogizing to logarithms, to divide one number by another merely requires subtracting the exponent portion of the divisor numerical value from the exponent portion of the dividend numerical value. Then the fraction portion of the divisor numerical value is divided into the fraction portion of the dividend numerical value. This latter step, it may be appreciated, is the usual fixed point operation mentioned above.

A comparison flip-flop is utilized to determine the comparative value of the fractional portions of the two operands. If the fraction portion of the divisor is larger than the fraction portion of the dividend, the computer carries out the fixed point divide operation. However, if the dividend is larger than or equal to the divisor, the dividend fraction is de-normalized by one bit to make the divisor the larger number.

The term normalization is the opposite of de-normalization. The fractional portion is normalized by shifting it left and in order that the numerical value remains unchanged, the exponent is decremented by one for each bit the fractional portion is shifted left. The term de-normalization refers to shifting numbers in a particular register to the right a predetermined number of bit positions, usually to align the operand in one register with an operand in another register or to avoid division overflow. The exponent portion of the numerical value involved is incremented by one for each bit of right shifting of the fraction portion. In either case, normalization or de-normalization, it can thus be seen that the value of the number remains the same.

In order to carry out the process of division, an initial subtraction operation is performed using the fractional portions and the difference is transferred to the first register and precessed left one digit. The two exponents are also subtracted and the difference is transferred to the second register.

When dividing a number with a larger exponent in the first register by a number with a small exponent in the second register, an exponent overflow may occur. If the reverse is true, division of a small exponent number by a large exponent number, an exponent underflow condition may occur. Another flip flop is utilized to detect these conditions, but termination of the operation does not occur in either case. If the dividend or divisor is a zero, however, the division operation is terminated.

The computer then carries out fixed point divide sequence. The quotient bit obtained at each word time is placed in the fourth register which holds each bit of the quotient until all quotient bits have been transferred back to the first register. The exponent of the quotient is also transferred to the first register.

It is therefore an object of this invention to provide a computer having a simplified floating point division.

It is still another object of this invention to provide an improved floating point division operation in a computer.

Still another object of this invention is to provide serial floating point division in an electronic computer.

A still further object of this invention is to provide floating point division requiring no programmed normalization or de-normalization.

A further object of this invention is to provide an automatic normalizing and de-normalizing floating point operation within a computer.

Another object of this invention is to provide a computer for handling floating point numbers in a more compact form.

A final object of this invention is to provide an entirely automatic floating point division operation within a computer.

Still other objects and features of this invention will become apparent from the following drawings, in which:

FIG. 5 is an explanation of each of the operation codes;

FIG. 6 illustrates logic for I*n*D*o* phase of the floating divide operation;

FIG. 7 illustrates logic for U1 phase of the floating divide operation;

Figure 10:
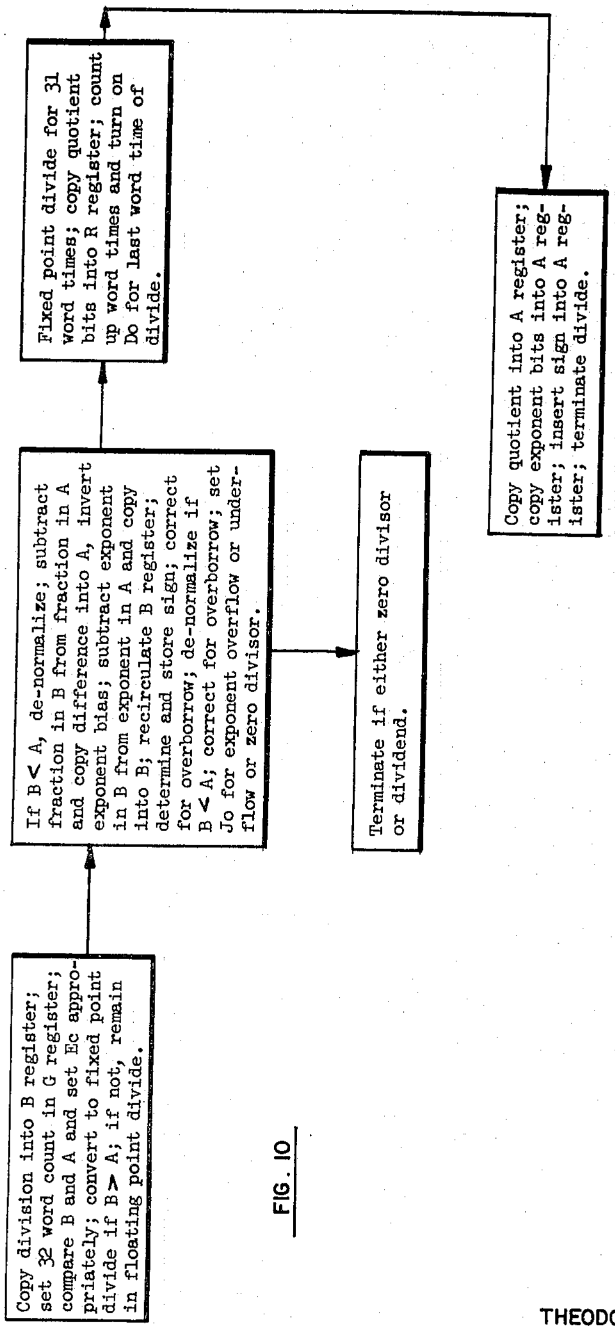
Figure 11:
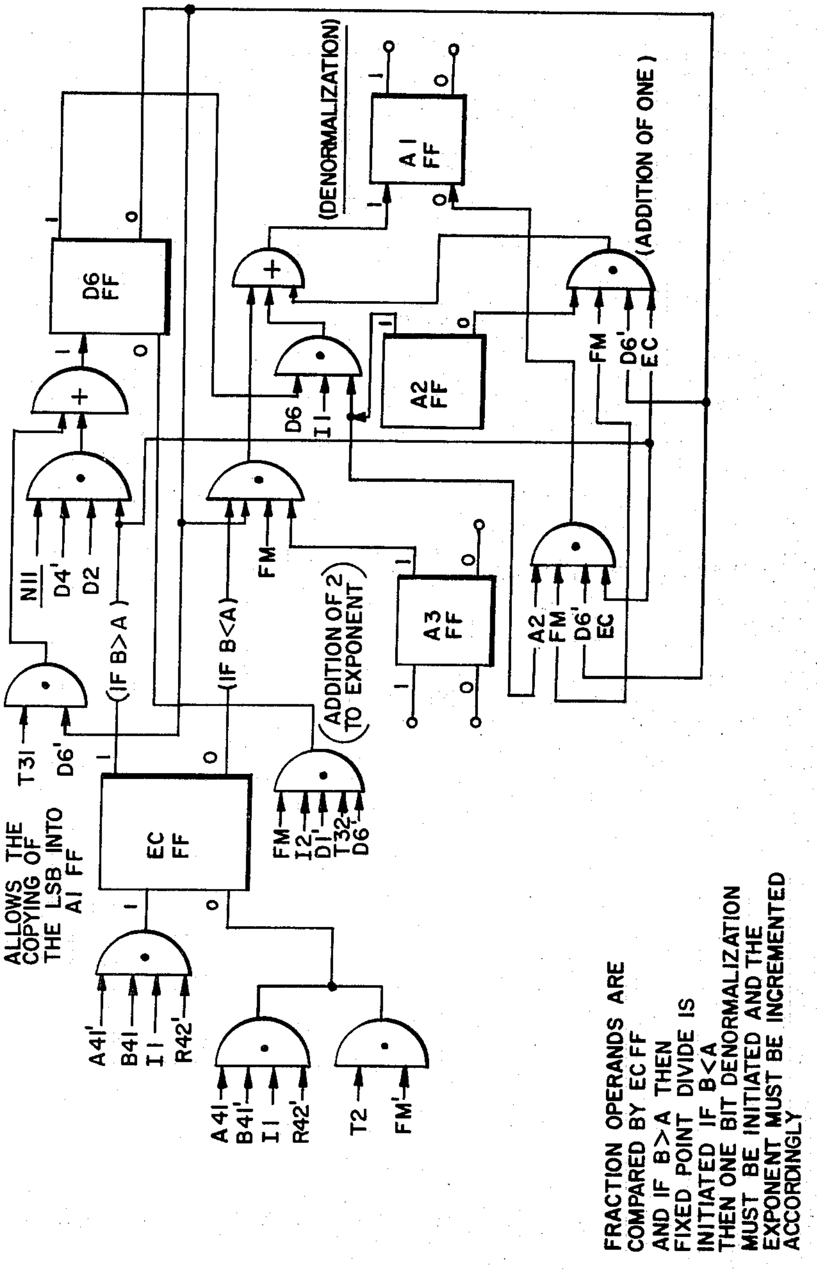
Figure 12:
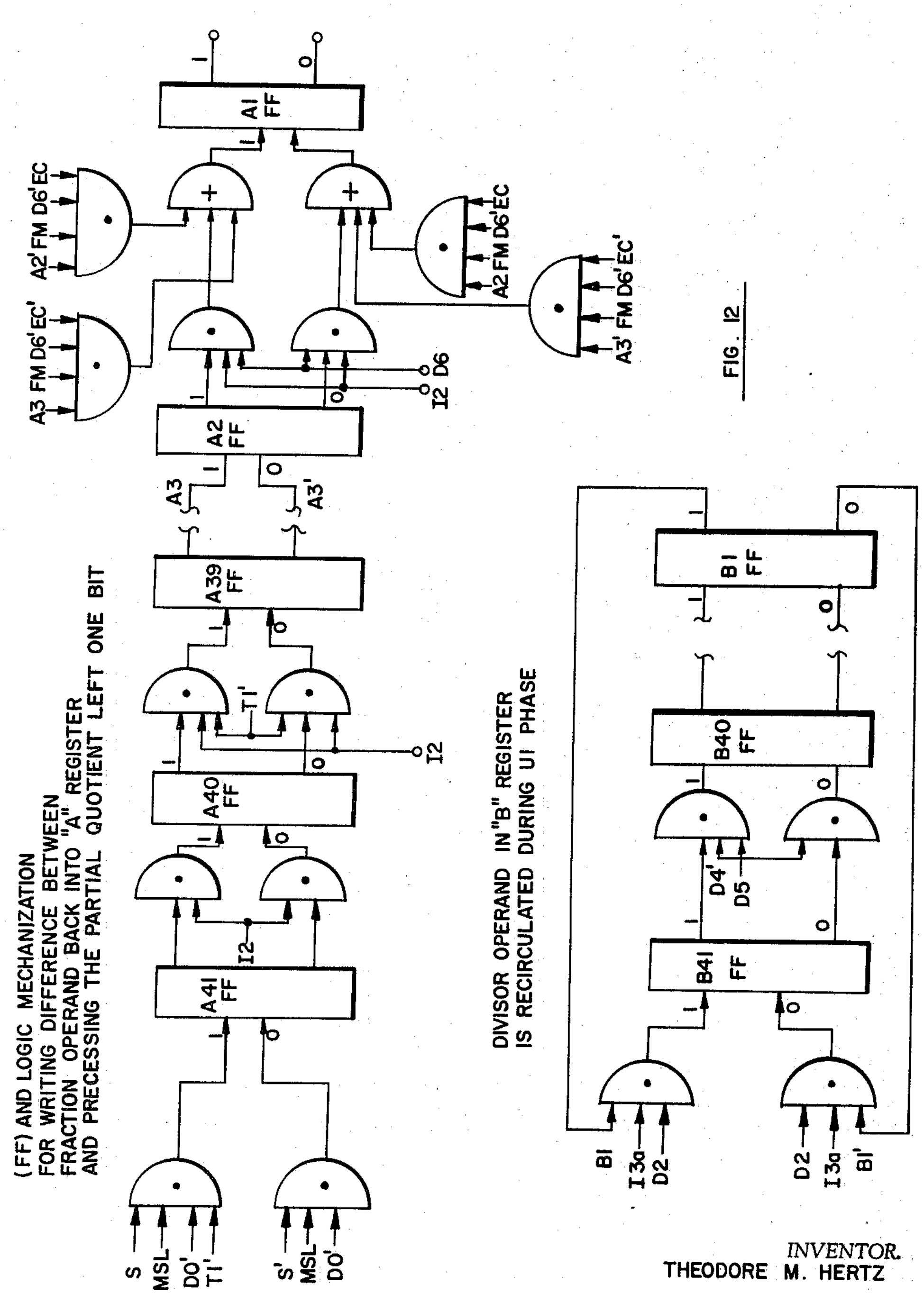
Figure 13:
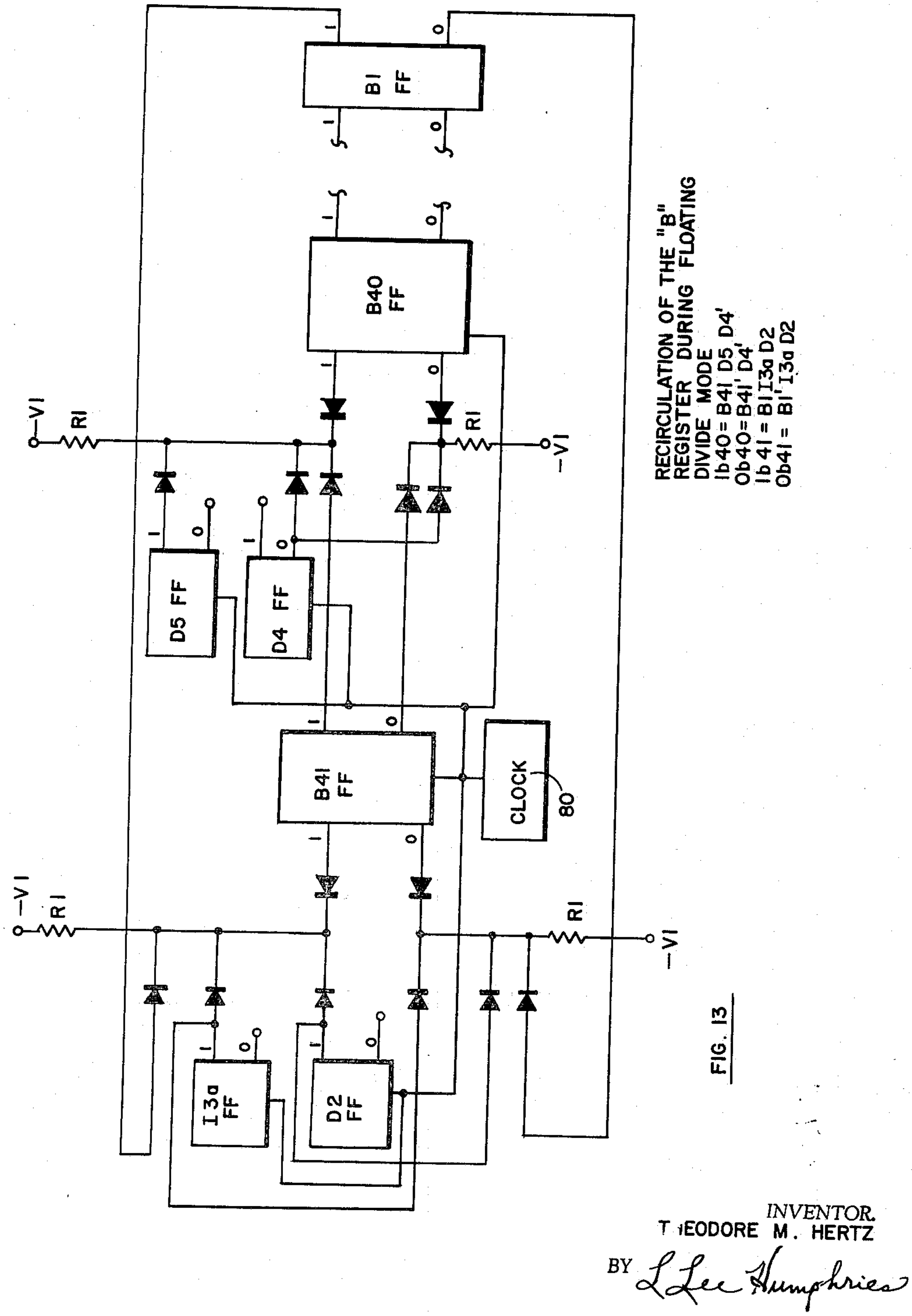
Figure 14:
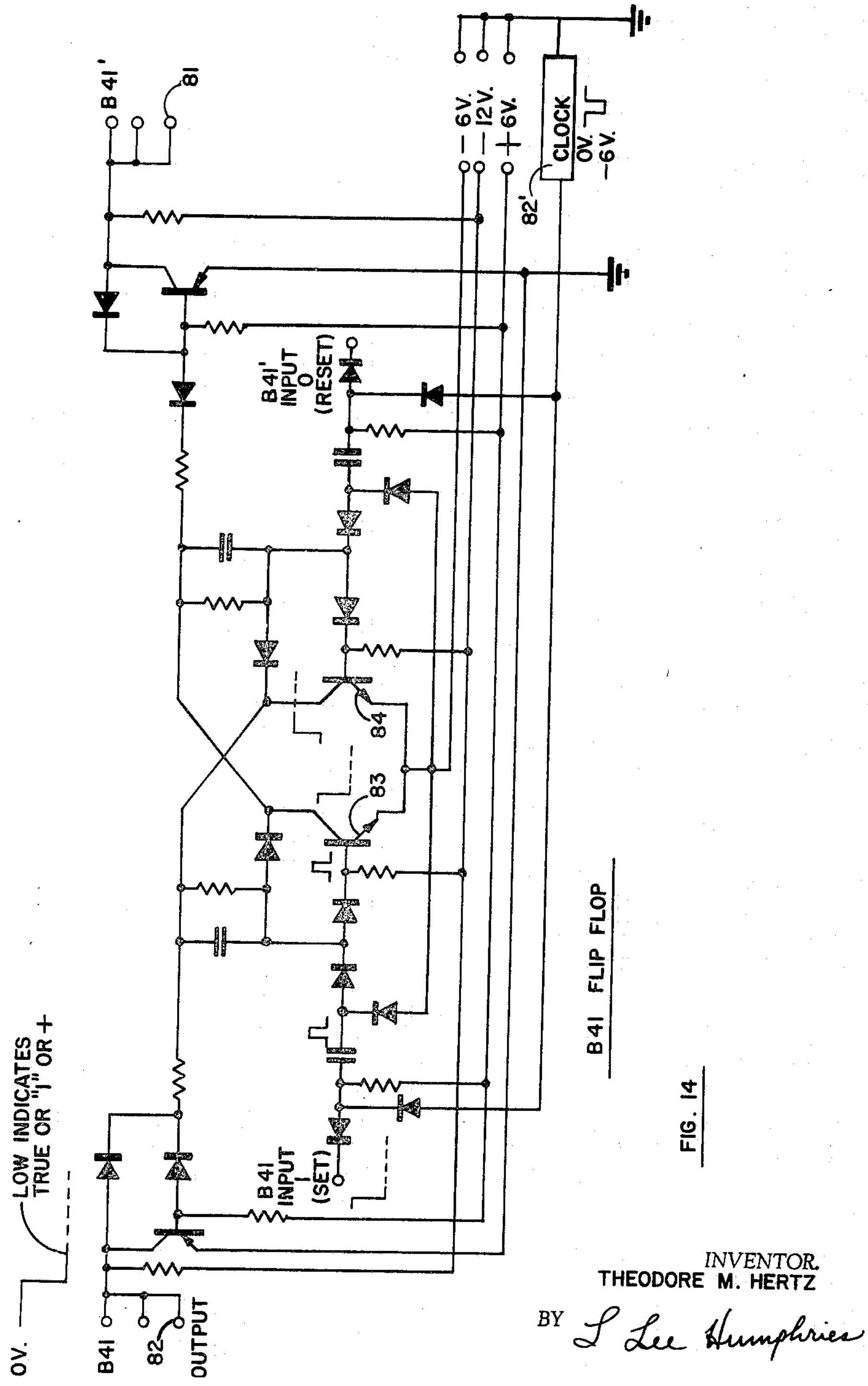

FIG. 7*a* illustrates a continuation of the logic for the U1 phase of the floating divide operation;

FIG. 8 illustrates logic for the U*i* phase of the floating divide operation;

FIG. 9 illustrates logic for the U*i*D*o* phase of the floating divide operation;

FIG. 10 illustrates a block diagram of each step of the floating divide operation;

FIG. 11 illustrates an example of logic mechanization for floating divide operation;

FIG. 12 illustrates an example of logic mechanization for floating divide operation;

FIG. 13 illustrates an actual electronic mechanization of the B register recirculation set forth in FIG. 12; and FIG. 14 is an illustration of a clock gated flip flop suitable for use in the device of the invention.

Figure 1:
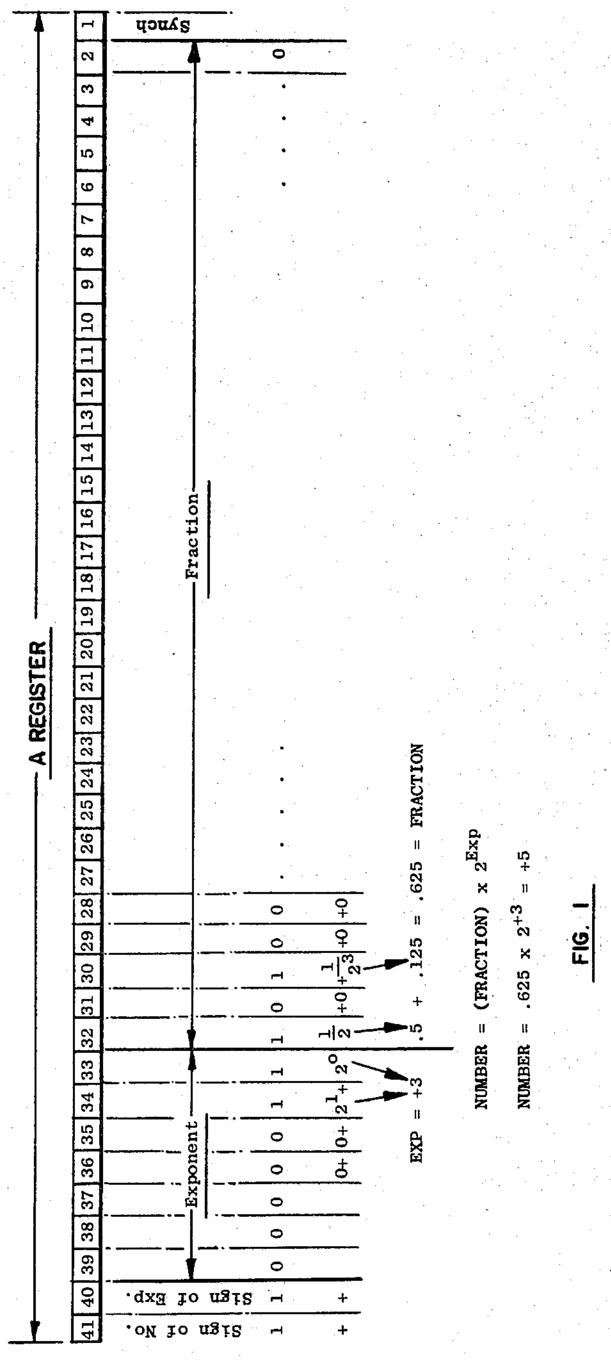
FIG. 1 is an illustration of a positive operand having an exponent portion and a fraction portion contained in an accumulator or "A" register within a computer.

Referring now to FIG. 1, it is seen that floating point information may be handled in a computer in words each consisting of 41 bits, the bits being numbered from right to left in order of increasing significance. The first bit is a synchronizing bit and is not utilized in computer operations. Bits 2 through 32 are utilized to indicate in binary form the fraction portion of the particular floating point number being processed. The bits 33 through 40 are used to indicate the exponents, that is, the power to which the number 2 is raised. With such 8 bits, therefore, the number 2 may have any power from zero to 255, however, by introducing a bias of −128, the range is shifted by 128 to a range of −128 through 127 with bit 40 being utilized to indicate whether the exponent is plus or minus. For example, to represent a number having a negative exponent such as is the case of $2^{-128}$, bit 40 is false (or "zero") and bits 33 through 39 are 0000000. For $2^{-1}$, bits 40 through 33 are 01111111. For $2^{0}$, bits 40 through 33 are 10000000. For $2^{+1}$, bits 40 through 33 are 10000001. For $2^{+2}$, bits 40 through 33 are 10000010. For$2^{+3}$, as illustrated by FIG. 1, bits 40 through 33 are 10000011. For $2^{+126}$, bits 40 through 33 are 11111110. For $2^{+127}$, bits 40 through 33 are 11111111.

Another way to describe the biasing effect is to consider a register having a capability of counting from zero through 255. However, in order to establish a capability of counting below zero, there is included in the computer logic gates to indicate a 01111111 for the exponent (−1, which stands for $2^{-1}$) and there are additional logic gates to cause the computer to count down (−1 through −128) from 01111111 to 00000000. If bit 40 is minus then each bit changed to 0 from 1 represents a greater numerical value (disregarding the sign). Thus, −1 represented by 01111111 would be decremented to −128 represented by 00000000. If bit 40 is plus each decremented bit represents a decrease over a range of 127 through zero. Where the zero is relocated at the center of a register's counting range (the computer formerly being capable of counting from zero to 255, i.e., an 8 bit counter), allotting zero to one of the counts leaves a capability of counting up to +127 and down to −128.

In effect by dividing zero through 255 into two parts by appropriate logic gates, the register counts up from zero through 127 and down from −1 through −128. If bit 40 is minus, the register counts over the negative range. If bit 40 is positive, the register counts over the positive range.

It should be noted that the binary point is assumed to be at the left of the fraction part of the number in FIG. 1. It may also be seen that the exponent is determined by bits 33 through 40, and the fraction is determined by bits 2 through 32. The floating point number is determined by raising 2 to the exponent indicated and multiplying by the fraction, as shown in FIG. 1.

Figure 2:
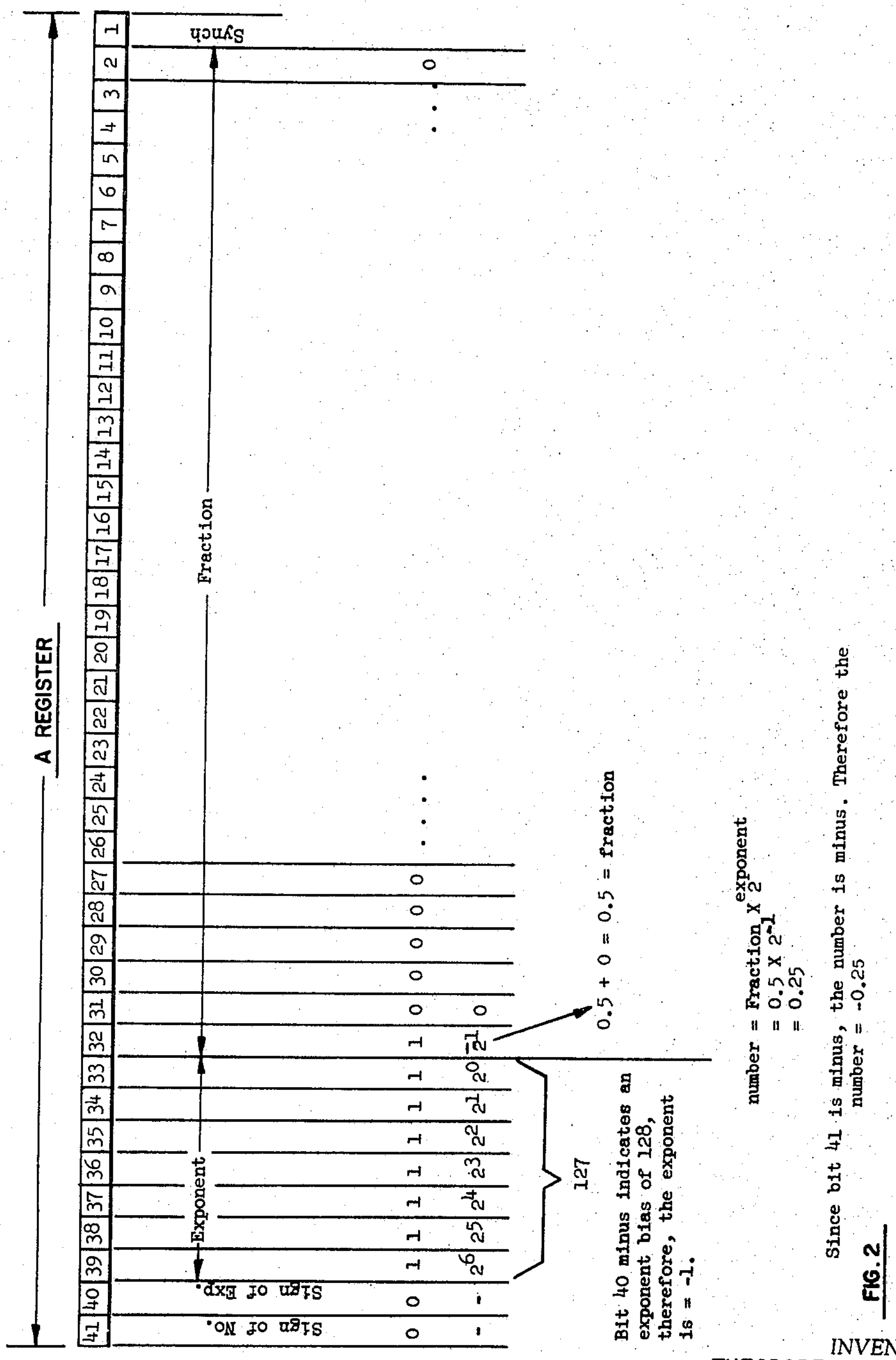
FIG. 2 is an illustration of a negative operand having an exponent portion and a fraction portion contained in an accumulator or "A" register within a computer.

A negative number is illustrated in FIG. 2. The exponent is expressed in 2's complement form which is obtained by subtracting the negative number from all zeros. The A40 bit is reversed during the multiplication operation so that the product will have the correct sign.

In all floating point operations, logic control is utilized to insure that all operations specified by the instructions are performed in the correct mode and in the proper sequence. Basic control elements in the computer are logic gates and flip flops operating in conjunction with control registers and other registers. The states of the flip flops define the logic control functions of mode designations, operation selection, loop and main memory selection, channel selection, and sector selection.

Figure 3:
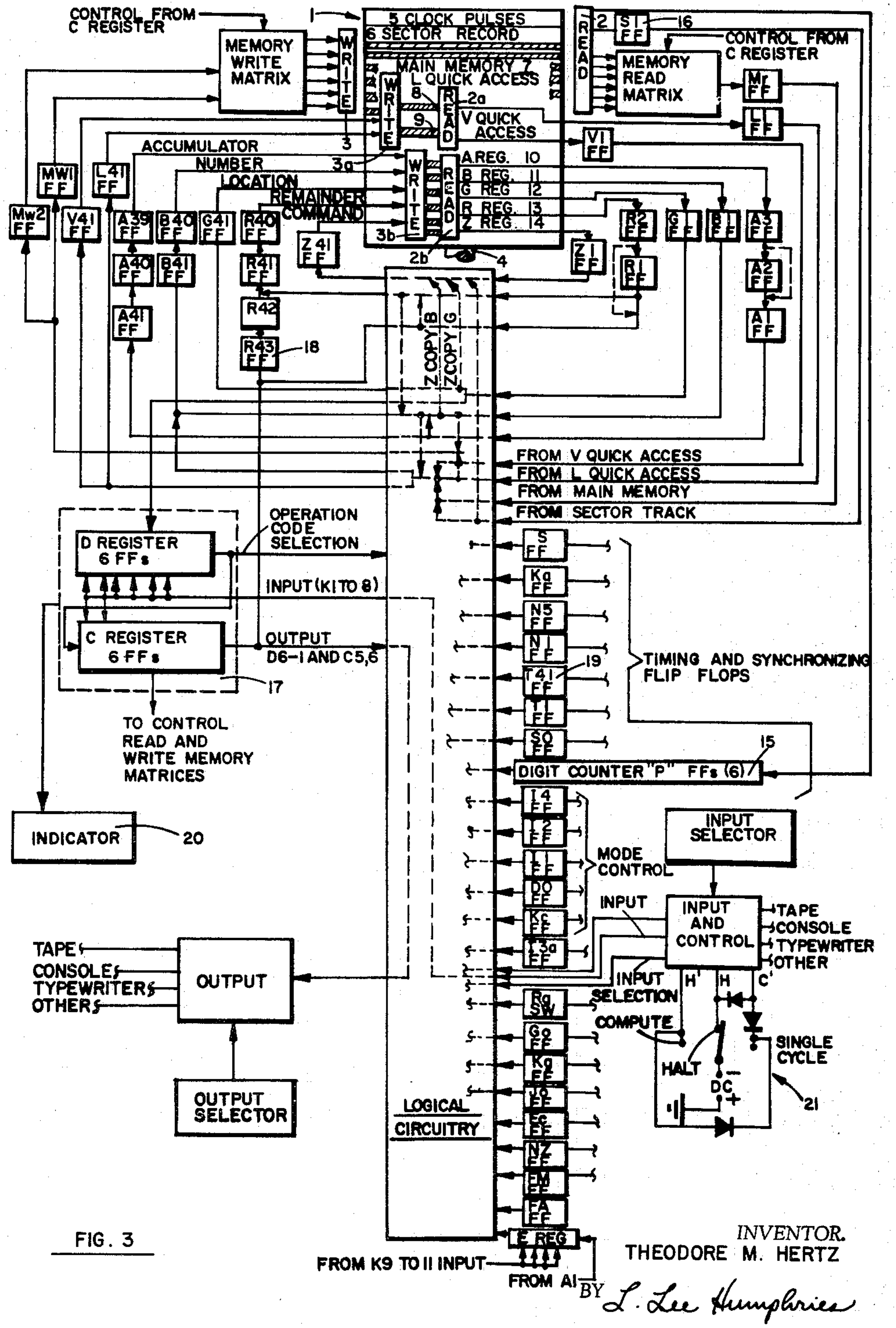
FIG. 3 is an illustration representing an entire electronic digital computer.

Flip flops I1, I2, and I4 shown in FIG. 3 are the primary elements controlling the computer through the various modes and in the transitions from one mode to another. Two other flip flops designated as mode selection flip flop K*c* and memory write/read gating flip flop D*o* are also utilized as control elements. However, both K*c* and D*o* also perform other functions on a time sharing basis as do a number of other logic flip flops.

A D register comprised of flip flops D1 through D6, illustrated in FIG. 3, defines the type of operation to be performed by the computer. The flip flop settings are determined by the bit configuration and the operation code of each command. Outputs of the flip flops then control the operation control gating matrix to define the type of operation specified.

The C register is comprised of flip flops C1 through C6. The C register holds the channel address code which controls the gating of the write and read switching networks in the selection of a designated memory channel. Outputs of these flip flops enable the write or read head of a selected channel after a desired sector has been located during the sector selection phase.

Sector selection is the procedure which determines the sector location of a designated command or operand in the memory. The Z register, the origin sector channel, and several associated flip flops comprise the sector selection elements.

The control registers (Z and G) and their associated logic circuits perform many of the control functions required in the location storage modification and execution of commands and in the handling of data. The "A" register is comprised of a write and read amplifier and 39 bits circulating in the loop register channel. The Z register stores the command pair being executed. The G register, also comprised of a read and write amplifier and 39 bits circulating in the loop register channel, and contains storage space for the location counter, index register. The G register is also used as a computation cycle counter.

The arithmetic registers (A, B, and R) and their associated logic circuits perform the basic computer arithmetic functions of addition, subtraction, multiplication, and division. These registers also perform many semi-arithmetic and control functions. In the execution of arithmetic commands the registers utilize two additional flip flops which, during the computations, form an adder-subtractor circuit.

Figure 4:
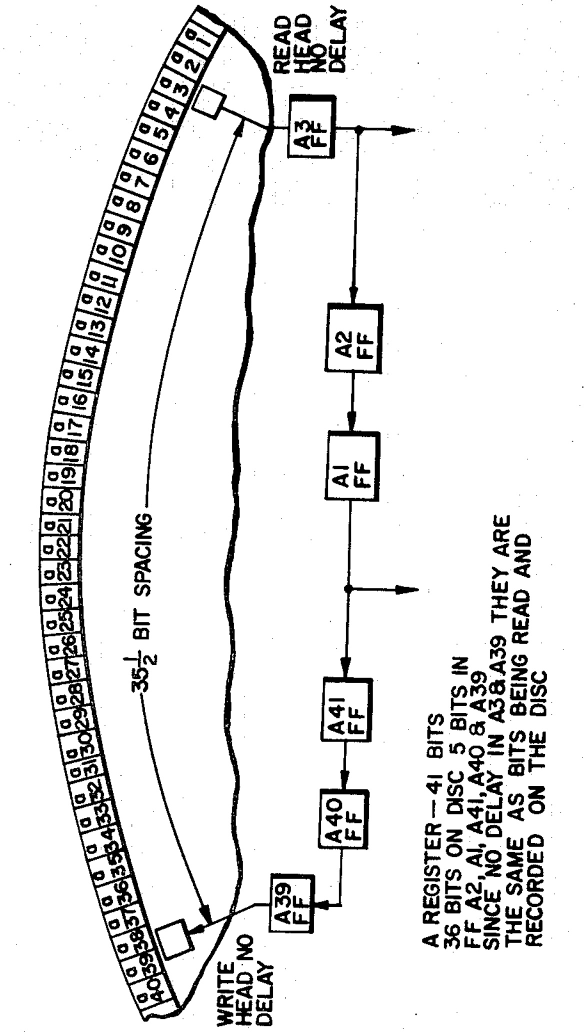
FIG. 4 is an illustration of an accumulator or "A" register.

The A or accumulator register shown in FIG. 4 stores the information in six flip flops and in 35 bit positions in the loop-register channel. Utilized in all arithmetic computations, the A register accumulates all or a portion of the result of each computation.

The B register shown in FIG. 3 which is also referred to as the number register, utilizes three flip flops and 38 bit positions in the loop register channel. This is an intermediate storage register which is not directly addressable by the programmer. In most instances, the computer first stores a command or operand being read from or written into memory in the B register, and then transfers the word to the intended locations as required. The remainder or R register shown also in FIG. 3 stores its contents in four flip flops and 37 bit positions in the loop register channel. (R42 and R43 flip flops are not an integral part of the register.) This register may be utilized as an extension of the A register in the execution of multiplication and division commands.

Principal computer elements involved in the execution of the arithmetic processes are the three arithmetic registers and the adder-subtractor circuit. The adder-subtractor circuit is comprised of a sum-difference flip flop and a computation carry-borrow flip flop K*a* which operates in conjunction with the arithmetic registers to carry out the computations. The flip flops S and K*a* are illustrated in FIG. 3. Other computer elements such as the memory read/write circuitry and the control registers also are utilized. However, these other elements perform associated functions which generally enter into virtually all of the computer operations.

The three arithmetic registers and the adder-subtractor circuit are the principal computation elements for both the fixed point and floating point arithmetic processes. However, additional flip flops and primary and secondary gates are necessary to control the floating point processes. For example the computer utilizes the additional flip flop F*a* during floating point addition and subtraction functions and F*m* during floating point multiplication and division functions. Flip flop E*c* is designated as the comparison flip flop for floating point addition, subtraction and multiplication. Primary gates $\underline{Mo}$, $\underline{M1}$, $\underline{M2}$, $\underline{U1}$, and $\underline{Ui}$ are also utilized during the floating point operation. $\underline{Mo}$ is used during addition and subtraction operation. $\underline{M1}$ is used during multiplication operation. $\underline{M2}$ is used during divide operation. $\underline{U1}$ signifies the second word time of all word times, and $\underline{Ui}$ signifies all succeeding word times.

Further explanation of a computer and its operation may be obtained by reference to patent application Serial No. 187,319, filed April 13, 1962 for "Computer" invented by me. The various operations and modes of a general purpose scientific computer are set forth in that application as well as a description of conventional logic notation.

FIG. 5 is a further explanation of each of the codes. It is noted that code 23 (FDV, floating divide) is primarily involved in this description. However, in carrying out this code, other codes are "forced" (entered). For example, fixed point division, code 66, may be temporarily entered to make use of its right subtraction and right shifting capability. Also, the addition mode 73 may be temporarily entered.

Other modes are entered into as necessary, however, the additional modes entered into are set forth below.

FIGS. 11 and 12 illustrate examples of logic mechanization inside a computer used to perform floating divide operation. Symbols used for "and" gates and "or" gates as well as for flip flops are well known in the art. FIG. 13 illustrates an example of logic mechanization using conventional symbols for diodes, resistors, and voltage supplies. The example relates to recirculating the B register shown in FIG. 12. The B41 flip flop (which may be constructed as set forth in FIG. 14) is gated by a clock 80. The other flip flops shown are also gated by clock 80. Flip flops I3*a*, D2, B1 act to set flip flop B41 to its "one" state. The same flip flops with B1 set to its zero state (B1′) act to set flip flop B41 to its "zero" state. Flip flop B40 is similarly set by flip flops D5, D4, and B41. A discussion of logic gates may be found in "Digital Computer Components and Circuits" by R. K. Richards, 1959. FIG. 14 illustrates an example represented by the box symbols in other figures. The flip flop B41 illustrated in FIG. 14 shows two transistors 83 and 84, one of which conducts when in input is received at the "1" input terminal. The other conducts when an input is received at the "0" input terminal provided a clock pulse from clock 80 is also received. If one transistor conducts, the other is shut off. Therefore, a −12 v. output is provided at terminal 82 or 81 depending on whether the flip flop is in its "one" state or "zero" state respectively. Flip flop circuits are discussed in "Transistor Circuit Engineering" by R. F. Shea.

Although only certain selected portions of the logic is mechanized, the remaining logic is mechanized in the same manner as is well known to those skilled in the art.

FLOATING DIVIDE

The following description concerns the floating divide operation. Octal 26 designates floating divide operations. FIGS. 1 through 12 are referred to in connection with this operation.

*InDo phase*

The dividend is assumed to be in the A register originally and the divisor is copied into the B register during this phase. A count of 32 is set up in the G register. During U1 phase one possibility that may occur is overflow which may result from division if the divisor is smaller than or equal to the dividend (B less than or equal to A). Assuming that both numbers are in the normalized form initially, then a one bit de-normalization of the dividend during the U1 phase insures that no division overflow occurs.

It is necessary during the I*n*D*o* phase, to compare the numbers in the A and B registers to determine which is larger or smaller. If the contents of B are greater than the contents of A then flip flop E*c* is one set. However, if A is greater than or equal to B, flip flop E*c* is zero set and a one bit de-normalization of the dividend will be necessary during the U1 phase. The R42 flip flop is one set at T33 time to exclude the exponent from the number comparison. At the end of the I*n*D*o* phase, flip flop F*m* is one set and flip flops R42 and R43 are zero set to prepare for the divide operation that begins in the U1 phase. If B was determined to be greater than A then flip flop D6 is one set to force the operation code to fixed point divide. Cascaded "and" gates $\underline{MsL}$ and $\underline{M2}$ are also true for division.

*U1 phase*

The exponent bias is inverted here by inverting bit A40 at T1 time. The inverted bit is copied directly into A30 at T1′ time. During the first word time of this phase the contents of the B register are subtracted from the contents of the A register using standard fixed point subtract logic. After subtracting the fraction parts the differences are written back into the A register and precessed one bit left. The exponent difference is written back into the B register. Flip flop R1 is set for gating the B register into the subtractor. The contents of the A register are always shifting into the subtractor. The contents of the B register recirculate during this operation. The sign of the quotient is determined and stored.

*Overborrow (A greater than or equal to B)*

Since E*c* flip flop is false for this condition, an one bit de-normalization is necessary to utilize fixed point divide logic and to prevent an overflow. Flip flop D6 is not turned on and therefore the computer is still in operation code 26 (floating divide). The A2 flip flop is not used as part of the A register in order to right shift by one. The one bit right shift converts from a condition of B less than or equal to A to B greater than A (assuming that the numbers were de-normalized originally) so that an overborrow results from the subtraction of fractional parts or mantissas.

It is necessary to correct for the overborrow condition once again but to do so requires adding "two" back to the exponent because an extra subtraction of one has occurred. If B had been greater than A, then the carry flip flop would have been on at the end of the first subtraction. Since the subtraction is followed by subtraction of exponents, the one set carry flip flop would cause an extra subtraction in the exponents unless one was added back to cancel out the one set carry flip flop.

Where B is less than or equal to A, however, the fraction must be right shifted by one in order to make B greater than A. The carry flip flop will be one set at the end of the first subtraction of fractions but also since the fraction portion was made smaller by the right shifting (one bit), the exponent must be incremented by one. Hence, for the case B less than or equal to A, two must be added to the exponent. The addition occurs before subtraction using a one-input adder. D6 is used as a carry flip flop and D6 set false means that the carry is on. If the carry is true, A2 will be inverted and read into A1. However, if the number 2 must be added, as indicated above, then instead of reversing A2 into A1, the inversion is delayed by one bit so that in effect two is added to the exponent portion of the A register instead of one.

*Overborrow (B greater than A)*

Since B is greater than A, E*c* flip flop has been set true and no de-normalization of A is required. Flip flop K*a* is true at T33 time indicating an overborrow in the case where B is greater than A after subtraction of the mantissas or fractions. This condition must be corrected as it would cause an extra subtraction thereby affecting the exponent. Flip flop K*a* is then left on since it cannot be prevented from coming on and the condition is compensated by adding a "one" in the transfer from A2 to A1. The carry flip flop for adding in the extra "one" is D6 so it must be zero set at T31 time. Turning off D6 sets the carry for the one-input addition. The overborrow is corrected by inverting A2 into A1.

*Exponent overflow and underflow*

In dividing a number having a very large exponent in the A register by a number having a very small exponent in the B register, an exponent overflow may occur. If the reverse is true an exponent underflow condition may occur. Flip flop J*o* is utilized to detect these conditions. Termination does not occur however for either of these conditions.

*Zero divisor*

If dividing by zero, an overflow will result and it is necessary to terminate immediately. The overflow flip flop J*o* is turned on and also K*c* is turned on which terminates the operation.

*Zero dividend*

If the dividend is zero, it is also necessary to terminate immediately. Flip flop D3 is turned off to force operation code 22 in the computer. Operation code 22 is then converted into operation code 62 by turning D6 on. Flip flop K*c* is turned on to terminate the operation and the entire quotient is forced to zero including the exponent.

Assuming however that the special cases have been dispensed with, or have never occurred, operation code 66 for fixed point divide is then changed to operation code 72 (subtraction) by one setting the D4 flip flop. The exponent difference cannot be copied into the A register so it is copied into the B register into bit position B40. At the end of the U1 phase the operation code 72 is conveted back to code 66 by zero setting D4 at T41 time. Code 66 is then converted into code 67 by one setting D1 to force addition during the second word time because of the overborrow that occurs during the first word time of division.

*Ui phase*

The phase is the same as the fixed point divide operation. It is the same every word time and it continues for 31 word times. R1 is turned on from T1 through T32 times so that the contents of the B register are gated into the subtractor or adder during this period.

The quotient bits end up in the R register in the R32 through R2 bit positions at the end of the U*i* phase. After 32 word times, D*o* must be set to enter phase U*i*D*o* which is the last word time of the divide operation. Flip flop C1 senses the last word count and one sets D*o* to enter U*i*D*o* phase.

*UiDo phase*

The quotient bits are copied into the A register during this phase by copying the R42 flip flop into A41 and shifting right. At T32 time the flip flop D4 is turned on to convert to operation code 77 which is clear and add. Gate Moo is true by one setting the D4 flip flop. Since this is true, the exponent of the quotient is copied from the B register into the A register into bit positions A41 and shifted right. The sign insertion takes place by copying C2 into A41 at T41 time. Final termination is initiated by turning on K*c* flip flop.

SUMMARY

The floating point divide operation uses 34 word times. Initially the A register contains the dividend operand and during the first word time the divisor operand is copied into the B register. A count of 32 is set up in the G register. The divisor and dividend operands, comprised of an exponent portion and a fraction portion, are compared and flip flop E*c* is appropriately set. If the fraction portion of B is greater than A then fixed point divide mode is set. If the fraction portion of B is less than or equal to A, however, the computer remains in the floating point divide mode. In the second word time the dividend is de-normalized to make the fraction portion of B greater than the fraction portion of A, fixed point divide is then entered. The fraction portion (mantissa) in B is subtracted from the fraction portion (mantissa) in A and copied back into A and precessed left one bit. Also during this word time the exponent bias is inverted. The exponent in B is subtracted from th exponent in A and the result is copied into B. Whatever corrections are necessary are performed. The B register is recirculated so that the divisor is unchanged. The sign of the quotient is determined and stored. The J*o* flip flop is set for exponent overflow or underflow or for zero divisor. If there is a zero divisor or dividend then the operation is terminated at the end of this word time. During the third phase, which utilizes 31 word times of the floating divide operation, the numbers are divided using fixed point divide logic and the quotient bits are copied into the R register. The floating divide logic is mechanized to use the Von Newman process of division, for example:

The fractional part of the dividend is in the A register and the fractional part of the divisor is in the B register.

| | | | |
|---|---|---|---|
| | | 10010011 | (A register) dividend |
| | | −10110000 (Step 1) | (B register) divisor |
| Overborrow | (1) | 11100011 | |
| | | +01011000 (Step 2) | |
| Over-carry | (1) | 00111011 | |
| | | −00101100 (Step 3) | |
| | | 00001111 | |
| | | −00010110 (Step 4) | |
| | | 11111001 | |
| | | +00001011 (Step 5) | |
| | (1) | 00000100 | |
| | | Final quotient= 1101 (A register) | |

Subtraction is performed to determine if an overborrow occurs, if overborrow occures a quotient bit of zero ($q_1=0$) is indicated and stored in the R register, then the divisor is shifted right 1 bit and added back to the partial remainder resulting from the subtraction. If the subsequent addition yields an overcarry a first partial quotient bit of 1 ($q_2=1$) is indicated and the next step will involve shifting the divisor right and subtracting from the the sum of the previous additions. The partial quotient bit is again stored in the R register. If no overborrow occurs as is illustrated by the results of step 3, then the quotient bit equals 1 ($q_3=1$). The divisor is next shifted right and subtracted from the partial remainder. If an overborrow occurs the quotient bit equals zero ($q_4=0$) and the divisor is shifted right and added back as in step 1. Then if overcarry occurs the quotient bit equals 1 ($q_5=1$). The serial combining of all quotient bits, often referred to as the partial quotient, forms the final quotient.

The Do flip flop is turned on the last word time of the floating divide operation, the quotient bits are copied into the A register from R with the exponent bits copied from B into A. The stored sign is copied into the A register and the divide operation is terminated.

*Logical equations*

A computer utilizing the concept of the invention was set forth and described in the patent application previously referred to. Such computer is also set forth in the logical equations included below. The computer incorporates 48 flip flops (bistable multivibrators or some other suitable bistable device) whose states are determined in accordance with the logical propositions set forth in the equations. For brevity and clarity, in some instances, symbols are used to indicate the settings of two or more flip flops. Such symbols and their meanings are also set forth. In addition, there are constructed several special gates operated according to the existence of two or more conditions. Various flip flops such as G1, Z1, B1 and A3 do not appear in the logical equations inasmuch as they are driven directly by the memory read heads or amplifiers. The logical equations are as follows:

LOGICAL EQUATIONS FOR FLIP FLOPS

N1

$1n1=P6'P5'P3'P2'P1KcDo'I1+Go'P6P5'P3'P2P1KcDo'+HoSoT40I2+GoT2Kc'+Go'T22Kc'+I1'C'T40$ $0n1=P5P4'P1Kc'+KaP4P2Kc'+WsP2P1+KcP5P4P2Do'+HoI2T41$

So

$1so=Kc'Do'Z1S1'N1T41'+Kc'Do'Z1'S1N1T41'+A1InKcT41'T1'+InD5'D4'T1Kc'+Z1S1WsT8+Z1'S1'WsT8+RgDoT1+Z1S1WsT28\ Z1'S1'WsT28+HoD6D5T2$ $0so=T41$

G41 Write $1g41=G1Kg'T41'+G1'KgI1'Do'+Z1HoN5Go'P6+C1'InKgDo'+N1T41P6+G1IqP6'+R43HoN5GoP6+DoKgT14P1'D6+G1H'T41I1+B1'HoN5'R42D5+DoKgT20D6'$ $0g41=G1'Kg'T41'+G1KgI1'Do'+Z1'HoN5Go'P6+DokgP5P4P3'P2+B1HoN5'R42D5+R43'HoN5GoP6+C1InKgDo'+G1'Iq+IqI2P6+DoKgT20D6+G1'N1'T41P6+IqHT41P6+I1'N1'T41$

Go

$1go=G1T22Inkc+I1'K41$ $0go=IcDo'+IcN1'T41$

Kg

$1kg=NR3I2T21Fa'+IqI2+P1I2'GoN5T14P6'+P1I2'Go'N5T14P6+T2MsLD5'C6+GoI4'T14P6'P1+Go'I4'T14P6P1+GoP6'NR13+NR3T2D6'D42D1'N5'+Go'P6NR13+NR3T1D6'D5M7+FaD2'T21$ $0kg=G1'KgI1'Do'+T20$

Do

$1do=13G1'R42D6'D42D1'+So'KoI4'I1Do'+So'UiD4'D2'Do'T41+M2C1'Ko+N1K41+U1M7T1$ $0do=HoN5'T14D1I2P1+K41G1'N1'+I1DoT41$

Mr

$1mr=MaC6'C5'C4'+MbC6'C5'C4+McC6'C5C4'+MdC6'C5C4+MeC6C5'C4'+MfC6C5'C4+MgC6C5C4'+MhC6C5C4$ $0mr=Ma'C6'C5'C4'+Mb'C6'C5'C4+Mc'C6'C5C4'+Md'C6'C5C4+Me'C6'C5'C4'+Mf'C6C5'C4+Mg'C6C5C4'+Mh'C6C5C4$

Ec

$1ec=A41'B41I1R42'+A1B1'Ka'Te+A1'B1Ka'Te+A1B1KaTe+A1'B1'KaTe+FmP6P5P3'$ $0ec=A41B41'I1R42'+T2Fm'$

P1

$1p1=P5'P1'T41'+T21$ $0p1=P5'P1+T41$

P2

$1p2=P1T41'$ $0p2=P1'+T41$

P3

$1p3=P2T41'$ $0p3=P2'+T41$

P4

$1p4=P3T41'$ $0p4=P3'+T41$

P5

$1p5=P4T41'$ $0p5=P4'+T41$

P6

$1p6=T21$ $0p6=T41$

T41

$1t41=T40+S1IqI2$ $0t41=T41$

T1

$1t1=T41P6$ $0t1=T1$

Cj

$1cj=Cj'$ $0cj=Cj$

Z41 Write $1z41=B1G1R43Ix+G1IcKcDo'+B1G1'R43'Ix+B1'G1R43'Ix+B1'G1'R43Ix+Z1Go+B1InKcGo'R42'+Z1Kc'+Z1I1'$ $0z41=B1'G1'R43'Ix+Z1'Go+B1'InKcGo'R42'+Z1'Kc'+Z1'I1'+B1'G1R43Ix+G1'IcKcDo'+B1G1'R43Ix+B1G1R43'Ix$

N5

$1n5=T1InDo'+IckcT22+KcDoT21+U1M7T1D6+G1'T22InDo'+I4I1'S'KaT1+Td$ $0n5=T41+DoT14+T20I4'$

Nz

$Inz=FaI2'D4T32+FmG1KgT2OD3'$ $0nz=I1$

Fm

$1fm=N11D6'D4'D2$ $0fm=I1T1+NzT41$

D6

$1d6=Z1InKc'Do'N5+SoInT41D5'D42D1+K8Pm+G1IcN5+A1N6KaC4'+B1Go'InN5Kc+Z1GoN5I3a'I2I4'+E1N6KaC4+T31D6'+N11D4'D3'+N11D4'D2Ec+FmC6A2'T1'$ $0d6=N5Ka'I4+A1'N6C4'+B1'Go'InN5Kc+G1'IcN5+Z1'GoN5I4'I3a'I2+Z1'InKc'Do'N5+E1'N6C4+T31D6+FmI2D1'T32C6'$

D5

$1d5=D6N5+K7Pm+NzT33$ $0d5=D6'N5+NzT41$

D4

$1d4=D5N5+K6Pm+I3D6'D3'D2'D1T40+NzT33+FaT33+FmT33D3'+FmT33I2+FmDoT32$ $0d4=D5'N5+FaEcT41+NzT41+FmT41$

D3

$1d3=D4N5+I3aD6'D5'D4T40+I3aD5'D1'T40+K5Pm+NzT41+FmT41D1'$ $0d3=D4'N5+A3T41InD6'D5'D42+A1InD6D5'D42T41+NzT33+FmT33I2+FaNz'T41+InDoD6'D4'D2A1'T32$

D2

$1d2=D3N5+K4Pm+FaT41$ $0d2=D3'N5+D1'InM5T41+A1'InM5T41+I3aNR8A1'+I3NR8R40'T1$

D1
1d1=JoInM5D2T41+M2I2T41+So'InT41M5D2'+D2N5+A1'KaM2T41+A41'B41D1'MoI2T1+A41B41'D1'MoI2T1+K3Pm+Ka'T41NR50Fa'+M2Do+FmI2T41+A1'KaT33FmI2'Nz'+MooD2'+FaNz'I2'T32
0d1=D2'N5+A1kaM2I2'T41+A41B41'MoD1I2T1+A41'B41MoD1I2T1+NzT41+A1KaT33FmD3Do'

Fa
1fa=MooD2'
0fa=I1

C6
1c6=D1N5+K2Pm+I3aD5T32+T31D6
0c6=D1'N5+I3aD5P4'P2'

C5
1c5=C6N5+K1Pm+FaC1ST1'+I3aB41T1D5
0c5=C6'N5+FaT2+I3aB41'T1D5

C4
1c4=C5N7+I41Ia+O41Io+I3aD5'D4'T40
0c4=C5'N7+I40Ia+O40Io+NR3T1D2+Td

C3
1c3=C4N7+I31Ia+O31Io+FaD1'P6P5P4'P3'
0c3=C4'N7+O30Io+130Ia+Td+I3aP5'

C2
1c2=C3N7+U1T1D2+I21Ia+O21Io+FaI2T1
0c2=C3'N7+D6D52D1U1T2A40'+D6D52D1'U1T2R40'+Td+S'MoI2'T1Fa'+I3aD6'D5'D4D1'C6+U1D4'D2A1'B1T41D5+U1D5D4'D2A40B40'T2+I20Ia+D6'D52D4'U1T2A40'+O20Io+A40T2I3aD6'D5'D4D1C6'+A40'T2I3aD6'D5'D4D1C6+MooB40'T2D5+FaI2T2C5'+FmI2T2A40'C5

C1
1c1=C2N7+I2M2+MmT33Ka'D3'+Fat2
0c1=C2'N7+G1KgI3aT20+M1T1+G1KgT20I4+Td+FaT1+NzT41

R43
1r43=C1N5Do+R2I3aT41'+I4'I1T1+B1G1Ix
0r43=C1'N5Do+R2'I3a+Z1'Go'T22InDo+Td+Z1'GoT2InDo+B1'G1'Ix+I3aT41

R42
1r42=R43MsLT41'T1'D6+M2D6D1'I2'T1+A41M2I2T1+R2MoT41'+D2'D1U1R43T1+D5D2'U1R43'T21D4'+I3D6'D1'P6'P3'P2P1'+IcDoB41'T22+MooEc'T1D2'+InDoD6'D2T33
0r42=R43'MsLt1'D6+M2D1I2'T1+I3a'KcT14+I3aD52T1+R2'Mo+D5I3a'T14I1'+K41+I4Tn+N11D2

R41
1r41=R42MsLD6Do'+R42Mo+C2MsdK41+R2MsdI2'T41'+R1I3a'+A1I3aI2D6D4D3+R1D6'+A2M1I2+R1I2dC4'+R1C4D1'
0r41=R42'MsLD6Do'+R42'Mo+C2'MsdK41+R2'MsdI2'T41'+R1'I3a'+A1'I3aI2D6D4D3+R1'D6'+A2'M1I2T41'+R1'I2dC4'+R1'C4D1'

R40
1r40=SM2Do+A2MsdT41+R41I3a'+R41D4+R41I2d+R41D6'+R41D3Do'+R41Do'T41'
0r40=S'M2Do+A2'MsdT41I2'+R41'I3a'+R41'D4+R41'I2d+R41'D6'+R41'D3Do'+R41'Do'T41'

R1
1r1=M2Do'T1+M2D1T1+MoT1+R2M1T41+R2I3a'+R2D5'Nz'+R2D6'Moo+FmT41R2D3'Nz'+FaKcT1+FmI2T32
0r1=I3aD5T40D6+R2'I3a'+R2'D5'+R2'Moo+FaI2T32+FmI2T1D3'+FmI2'T32

E4
1e4=A1N5Ka+K12Pm
0e4=A1'N5+N5Ka'

E3
1e3=E4N5+K11Pm
0e3=E4'N5

E2
1e2=E3N5+K10Pm
0e2=E3'N5

E1
1e1=E2N5+K9Pm
0e1=E2'N5

S
1s=S11Ka+A1B1'Ka'I3a+R10Ka'I3a+B1Ro1Ka'I3a+SooKaI3a+I3aC4T41+RooKaI3a+C6N5I1T13+D6I3N10D3'D1T41+I4TT41R42'+I3M7NR51
0s=SooKa'I3a+RooKa'I3a+B1Ro1KaI3a+A1B1'KaI3a+R10KaI3a+S11Ka'T41'+C6'N5I1T13+I4TnT41+I3Ka'T40N10+R40'I3aC4T1+I3aD6'T1+FaNzT1

A41
1a41=MsLT1'Do'S+C2I3aK41+R1U1D6D52D3D1'+A1Ho+R42M2DoT41'+A1I1T1'+A1I3D1+A1U1D53+A1I4N5'+A1B1I3+A1D5'D2'I4'T1'+C5N6+B1MooD2+A1U1D6D5'D1+A1'I3aD6'D52D3D1T41'+A1I3aD2'R42'+B1I3aD2'R42
0a41=MsLDo'S'+I4'T1Fa'+A1'I4N5'+C2'I3aK41+A1'I1+R1'U1D6D52D3D1'+R42'M2DoT41'+A1'U1D53+A1'Ho+Fa'I4'A1'D2'+B1'I3D5D1'+C5'N6+B1'MooD2+A1'U1D6D5'D1+A1I3aD6'D52D3D1T41'+FaI2T1+A1'I3aD2'R42'+B1'I3aD2'R42

A40
1a40=SI2'NR50+KaMsrFa'+A41I3a'+A41I2+A41D3+FaNz'D4'KcT1'+B41FmD4D1Do'I2'
0a40=S'I2'NR50+Ka'MsrFa'+A41'I3a'+A41'I2+A41'D3+FaNz'D4'Kc'+B41'FmD41Do'

A39 Write
1a39=SMsrT1'+A40I3a'+A40I2Fm'+A40T1I2'+A40D3I2'+A40D4+A40'FmI2I1'T1+A40FmI2T1'
0a39=S'MsrT1'+A40'I3a'+A40'I2Fm'+A40'T1I2'+A40'D3I2'+A40'D4+A40FmI2I1'T1+A40'FmI2T1'

A2
1a2=A3
0a2=A3'

A1
1a1=A3M2Do+R41M2I2'Do'T1Fm'+A2I3a'+A2D3'I2'+A2D5'+A2Do'T1'I2'+A2I2D6+A2'FmD6'Ec+A3FmD6'Ec'
0a1=A3'M2Do+A2'I2D6+A2'I3a'+A2'D3'I2'+A2'Do'T1'I2'+A2'D5'+A2FmD6'Ec+A3'FmD6'Ec'

L41 Write
1L41=MrM6D3'D1'+B1M6LTmS'+L1Do'+L1I2+L1I1+L1S+L1D3Ka'+L1D2
0L41=Mr'M6D3'D1'+B1'M6LtmS'+L1'Do'+L1'I2+L1'I1+L1'S+L1'D3Ka'+L1'D2

V41 Write
1v41=MrM6D3'D1+B1M6LtmS+V1Do'+V1I2+V1I1+V1S'+V1D2
0v41=Mr'M6D3'D1+B1'M6LtmS+V1'Do'+V1'I2+V1'I1+V1'S'+V1'D2

B41
1b41=MrDoKa'So'+S1RgDo+L1D10S'+V1D10S+A1R42D6D2'I1'+G1'NR1D5+R1NR1D5'+B1I3aD2+B1I4'Do'R42'
0b41=Mr'DoKa'So'+S1'RgDo+L1'D10S+V1'D10S+A1'R42D6D2'I1'+G1NR1D5+R1'NR1D5'+B1'I3aD2+B1'I4'Do'R42'

B40 Write
1b40=SMoI2+B41I3a'+B41D5D4'+B41MooD1+B41'MooD1'+B41MoI2'+B41FaD3
0b40=S'MoI2+B41'I3a'+B41'D4'+B41'MooD1+B41MooD1'+U1D52+B41'MoI2'+B41'FaD3

Ka
1ka=S11D1T41'D2+B1Ro1D1'I3aT41'D5C3'
+I1KcT1+I1KcGo'P5'P3'P2+I4ST41+I3D4T41
+NzT32D5'+FaD4'T32Kc'
0ka=SooD1I3aKa+RooD1I3aKa+A1B1'D1'I3a
+R10D1'I3a+I3aT41+N11D2+InKcN10D1'T41
+I4S'T41+IaS'P6T13+Z41'I1N1Kc+Moo
+FaD4D1'T32

Kc
1kc=IcDoKo+UiD3D1DoT40+NR3D4T1Fa'
+S1'UiDoT40+IqG1'H'T41
+U1D52D4'D1'C6A1T40+G1KgI3aT20C1'Fa'
+I4I1'G1KgT20C1'+MsLD5'C6ST40
+FaI2T41EcD2+FaNzD5T33S+D3NzT32S
+FaI2P6T14C5'D1'+FmI2T32B1'+FmT32I2D3'A1'
+FaD2'A1'B1'T32
0kc=U1Fa'NR50+I4'I1K41+Td+MooD2'T2
+FmC1I2'T1'

Jo
1jo=I2KaD1T41NR50+M2I2Ka'T41
+A1'B1I3D5D4D3+I3aD2NR8T41
+MsLD5'A1T40C5+Jo'A1'T41I3D5D4D3R43'
+A1B1'I3D5D4D3R43+Kc'FmI2D1'T40A1'B1'Ka'
+NzKaT41Fm'+Kc'FmR1D1A1'B1KaT40
+Kc'FmR1D1A1B1'Ka'T40
+Kc'FmI2D1'T40A1B1Ka+FmI2D1'T32B1'
0jo=Td+InT41M5D2D1'+A1B1'I3D5D4D3R43'
+JoB1'T41I3D5D4D3R43'

Mw1 Write
1mw1=L1M6LmT1'+B1M6MtmT1'+I1
0mw1=L1'M6Lm+B1'M6Mtm+M6Ka'D3T1

I1
1i1=I1'K41+Td
0i1=N11+InD5'D4T41+InD5'Ko

I2
1i2=N1'Go'I2'I1'K41+IcDoKo+Td+IqK41GoR43
+FaNz'I2'KoEc'
0i2=NR3KoD4'+I1'GoK41+N1K41+IqT40
+HoT41I2+I2MoKo+FaEcKo

I3a
1i3a=N11D2+U1D52T1+N11D6D4D3
0i3a=K41+Td

I4
1i4=Td+I1DoK41+I3D6'D53Ko
0i4=I4K41

Mw2 Write
1mw2=L1'M6Lm+B1'M6Mtm+T1
0mw2=L1M6LmT1'+B1M6MtmT1'

SYMBOLS AND SPECIAL GATES

CLO=I4I1
D10=DoKa
D42=D4D2'
D52=D5'D2
D53=D5'D3'
Ho=I1'DoI3a'
Ia=I4I2'I1'
Ic=I4'I2'I1
In=I4'I2I1
Io=I4I2I1'
Iq=I4I1
Ix=I2I1N5R42
I2d=I2D5'D3'
I3=I4'I1'Do'I3a'
Ko=Kc'T41
K41=KcT41
Lm=D3D1'
Ltm=KaD3D1
Mo=I3aD5D4D3'
Moo=I3aD5D4D3T41'
M1=I3aD5D4'D3'
M2=I3aD5D4'D3
M5=D6D5'D4D3'
M6=I2'I1'DoD4'D2'
M7=D4D3'D2'D1
Msd=D6D4'D3'D1I3a
MsL=D4'D3I3aC4'
Msr=D4'D3'D1I3aI2'
Mtm=Ka'D3D1
N6=I4N5I1'
N7=I4'N5
N10=D4'D2'
N11=I2I1DoT41
NR1=R42D6'I1'Fm'
NR3=I4'I1'
NR8=D6'D5'D3D1C6
NR13=P5P4P3P1SKa'I2
NR51=TT41
NR50=I3aD5D4D3'Fm'
OD=I4I2I1'S'Ka'
Pm=I4I2'I1'S
Roo=A1'R1'C4'
Ro1=A1'R1
R10=A1R1'
Soo=A1'B1'C4'
S11=A1B1R1I3a
T33=P6P5'P3P2P1'
T32=P6P5'P4'P3P2
T31=FmI2P6P5P4'P3'D3
T2=P6'P5'P3'P2'P1
T8=P6'P4'P3P1'Ka'Go
T13=P5'P3P2P1'
T14=P5P4P3
T20=P5P4P3'P1'
T21=T41'P5P4'P3'P2'
T22=P6P5'P3'P2'P1
T28=P6P4'P3P1'Ka'Go'
T40=P6P5P4P3'P1'
Tn=Tp'Tr'Tfp'Tfr'
T=Tp+Tr+Tfp+Tfr
Te=I1'C6Fm'
Tp=Tape is being punched
Tr=Tape is being read
Tfp=Tape is being punched on auxiliary punch
Tfr=Tape is being read on auxiliary reader
U1=I4'I2I1'Do'
Ui=I4'I2'I1'
Ws=I4'I1'D4'D3D2'Do'
CLO=I4I1 Turns "compute" light off
Jo'=Overflow light
D6'–D1'=Channel lights 6 to 1
C6'–C1'=Sector lights 6 to 1
R43'=Half-word light Compute switch signals:
- Halt: Both H and C' signals present
- Compute: H' only
- Single cycle: H' and C' signals present Conditions of C2, C3, C4 for input and output:
- Electric typewriter keyboard (input and output)—C4'C3'C2'
- Electric typewriter punch—C4'C3'C2
- Electric typewriter reader—C4'C3'C2
- Auxiliary reader and punch—C4'C3C2'
- Option—C4'C3C2
- Card reader and punch—C4C3'C2'
- Automatic—Program Although the invention has been described and illustrated in detail, it is to be clearly understood that the same is by way of illustration and example only and is not to be taken by way of limitation, the spirit and scope of this invention being limited only by the terms of the appended claims.

I claim:

1. In an electronic digital computer, means providing floating point division of one operand by another, each of said operands having an exponent portion and a fraction portion, one of said operands being a divisor and the other of said operands being a dividend; means for serially combining the fraction portions of said operands and means for serially subtracting the exponent portions of said operands, whereby a quotient is produced, said quotient being represented by the combined fraction portions of said operands and the subtracted exponent portions of said operands.

2. The combination as recited in claim 1 wherein the means for serially combining comprises means for dividing said fraction portion of said dividend by said fraction portion of said divisor.

3. The combination as recited in claim 1 wherein the means for serially combining said fraction portions comprises means for dividing said fraction portion of said dividend by said fraction portion of said divisor; said means for division comprises means for successve subtractions or additions, as the case may be, of the divisor operand from the dividend operand, means for right shifting by one bit said partial remainder resulting from said successive subtractions or additions, as the case may be, including means for left shifting said partial quotient into said fourth register after each successive subtraction or addition.

4. In an electronic digital binary computer means providing floating point division of two operands comprising first and second binary registers in said computer, one of said operands being in one of said registers and the other of said operands being in the other of said registers, said operands in said registers being comprised of an exponent portion indicating the power to which the number 2 is taken and further being comprised of a fraction portion; means for executing fixed point division; means for combining said fraction portions and said exponent portions in a floating point division operation, said floating point division operation being changed to fixed point division for combining said operands.

5. The combination as recited in claim 4 wherein one of said operands including its exponent and fraction portions is a divisor operand and the other of said operands is a dividend operand, and where each of said operands are contained in a respective register as a single computer word.

6. The combination as recited in claim 4 wherein one of said operands including its exponent and fraction portions is a divisor operand and the other of said operands is a dividend operand, and where each of said operands are contained in a respective register as a single computer word and further wherein said means for combining said exponent portions comprises means for subtracting one of said exponent operands from the other, said subtracting means producing a difference, means for storing said difference.

7. The combination as recited in claim 4 wherein one of said operands including its exponent and fraction portions is a divisor operand and the other of said operands is a dividend operand, and where each of said operands are contained in a respective register as a single computer word and further wherein said means for combining said exponent portions comprises means for subtracting one of said exponent operands from the other, said subtracting means producing a difference, means for storing said difference, and said means for combining said fraction portions and said exponent portion comprises said means for fixed point division.

8. In an electronic digital computer, means providing floating point division of one operand with another, each of said operands having an exponent portion and a fraction portion; said means for providing floating point division producing a quotient; means for copying one operand into a first register and for copying the other operand into a second register; means for executing fixed point division; means for controlling said floating point division including means for indicating completion thereof; means for shifting said operands to a proper position for executing said floating point division; means for determining the sign of the quotient and for storing said sign; means for combining said exponent portions of said operands into one exponent including means for storing said combined exponent portions; means for determining if either fraction operand is zero and including means for termination of said floating point division if either fraction operand is zero; means for converting from floating point division to fixed point division including means for executing said operation upon the fraction portions of said operands after conversion; means for terminating said floating point division.

9. The combination as recited in claim 8 wherein said exponent portions of said operands include either a negative or a positive sign.

10. The combination as recited in claim 8 wherein said means for controlling said floating point division comprises a third register set to the number of word times required for said digital computer to complete the division operations, said register being set for counting each word time of the floating point division, completion of said division operation being signified by the counting of said third register to zero.

11. The combination as recited in claim 8 wherein said register is comprised of an operable combination of flip-flops and memory storage locations including logic gates for connecting said flip-flops and said storage locations as required to provide the counting of said third register to zero.

12. The combination as recited in claim 8 wherein said means for controlling said floating point division comprises a third register set to count a predetermined number of word times, including means for producing an output signal for terminating said floating point division after said predetermined number of words have been counted.

13. The combination as recited in claim 8 wherein said means for shifting said fraction operands comprises means for comparing said fraction operands in said first and second registers during the floating point division to determine the larger of said operands, including means for de-normalizing the operand in the first register if said second register operand is smaller than or equal to said first register, said comparing means including means for subtracting said operand fraction portion in said second register from said operand fraction portion in said first register and means for correcting any subtraction overborrow resulting therefrom, means for converting to fixed point division when said second register operand is larger than said first register operand.

14. The combination as recited in claim 8 wherein said means for combining said exponent portions comprises subtraction logic gates, addition logic gates and flip-flops for combining the exponents during said floating division.

15. The combination as recited in claim 8 wherein said means for executing said operation comprises means for converting to fixed point subtraction or addition, as the case may be, and further comprising means for succesively subtracting or adding said fraction operand in said third register from said fraction operand in said first register, each of said successive subtractions or additions yielding a partial remainder and a partial quotient, said partial quotients being combined after each successive subtraction or addition, and copied into said fourth register until said operation is complete; means for copying the final quotient into said first register and means for copying said combined exponent into said first register, means for inserting said stored sign into said first register; means for terminating said floating division.

16. In an electronic digital computer, means providing floating point division of one operand by another, said division yielding a final quotient; each of said operands having a sign associated with said operand, an exponent portion being comprised of bits indicating a power to which the number 2 is taken, the numerical value indicated by said exponent portion being biased so said exponent portion is capable of indicating either positive or negative exponents, and a fraction portion also being comprised of bits; one of said operands being a divisor operand and one of said operands being a dividend operand; first register means for holding said dividend operand; second register means for holding said divisor operand, third register means for counting down the number of word times required to complete said floating divide operation; fourth register means. means for comparing said divisor operand with said dividend operand to see if said dividend operand is greater than said divisor operand, means for right shifting said dividend operand if said dividend operand is greater than the divisor operand including means for adding one to the exponent portion of said dividend, including means for subtracting said fraction portion of said divisor from said fraction portion of said dividend and for copying and left shifting the difference into said first register; means for subtracting said exponent portion of said divisor from said exponent portion of said dividend and for copying the results thereof into said second register, said subtraction of exponents yielding a difference exponent, said difference exponent being the exponent contained in said final quotient; means for determining exponent overflow or underflow, as the case may be, and for setting the overflow indicator; means for recirculating said second register for preserving said divisor operand therein; means for determining and storing said sign of said division quotient; means for determining if either said divisor or dividend operand is equal to zero; means for terminating said floating divide operation if either said divisor or dividend operand is equal to zero; means for clearing said first register to all zeros if said dividend operand is zero; means for executing successive operations of subtracting or adding, as the case may be, the divisor operand and the dividend operand, said successive subtracting or adding yielding a partial quotient and a partial remainder, said partial quotient being represented by a quotient bit, means for left shifting by one bit said partial remainder after said successive subtractions or additions, as the case may be, means for determining whether or not the next operation is an addition or subtraction operation including means for determining the quotient bit after each successive subtraction or addition, including means for left shifting said partial quotient into said fourth register after each successive subtraction or addition; means for shifting said quotient from said fourth register into said first register after said successive subtractions and/or additions have been completed, including means for shifting said division exponent from said second register into said first register; means for inserting the sign of said quotient into said first register and means for terminating said floating point division.

No references cited.

ROBERT C. BAILEY, *Primary Examiner.*